(12) United States Patent
Park et al.

(10) Patent No.: US 7,532,551 B2
(45) Date of Patent: May 12, 2009

(54) METHOD FOR MANAGING DEFECTIVE AREA ON WRITE-ONCE OPTICAL RECORDING MEDIUM, AND OPTICAL RECORDING MEDIUM USING THE SAME

(75) Inventors: Yong Cheol Park, Gwachon-si (KR); Sung Dae Kim, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 870 days.

(21) Appl. No.: 10/670,381

(22) Filed: Sep. 26, 2003

(65) Prior Publication Data
US 2004/0071056 A1 Apr. 15, 2004

(30) Foreign Application Priority Data

Sep. 26, 2002 (KR) ............... 10-2002-0058516
Jan. 11, 2003 (KR) ............... 10-2003-0001857

(51) Int. Cl.
*G11B 7/00* (2006.01)
(52) U.S. Cl. ................. 369/53.17; 369/53.16
(58) Field of Classification Search .... 369/53.16–53.17
See application file for complete search history.

(56) References Cited

U.S. PATENT DOCUMENTS

| | | | |
|---|---|---|---|
| 4,733,386 A | 3/1988 | Shimoi et al. |
| 4,807,205 A | 2/1989 | Picard et al. |
| 5,111,444 A | 5/1992 | Fukushima et al. |
| 5,210,734 A | 5/1993 | Sakurai et al. |
| 5,235,585 A | 8/1993 | Bish et al. |
| 5,237,553 A | 8/1993 | Fukushima et al. |
| 5,247,494 A | 9/1993 | Ohno et al. |
| 5,319,626 A | 6/1994 | Ozaki et al. |
| 5,404,357 A | 4/1995 | Ito et al. |
| 5,442,611 A | 8/1995 | Hosaka et al. |
| 5,448,728 A | 9/1995 | Takano et al. |
| 5,475,820 A | 12/1995 | Natrasevschi et al. |
| 5,481,519 A | 1/1996 | Hosoya et al. |
| 5,495,466 A | 2/1996 | Dohmeier et al. |

(Continued)

FOREIGN PATENT DOCUMENTS

CN 1134017 A 10/1996

(Continued)

OTHER PUBLICATIONS

JIS Handbook data processing for hardware, Japan, Japanese Standards Association Inc., Apr. 21, 1999, pp. 1064-1070.

*Primary Examiner*—Wayne R Young
*Assistant Examiner*—Lixi Chow
(74) *Attorney, Agent, or Firm*—Birch, Stewart, Kolasch & Birch, LLP

(57) ABSTRACT

A method for managing a defective area of a write-once optical recording medium, and an optical recording medium using the same, are provided. The method includes steps of firstly writing replacement data in a predetermined area, the replacement data corresponding to a defective area detected during a data reproduction operation; secondly writing locator information in the predetermined area, the locator information indicating respective positions of the defective area and the corresponding replacement data; and thirdly writing a supplementary access pointer in a lead-in area, the access pointer for accessing the locator information written in the predetermined area. The predetermined area, which may be located inside or outside the data area, stores supplementary defect list information enabling data read operations when defective areas are newly detected by a host after recording data on a write-once type disc such as a BD-WO disc.

24 Claims, 8 Drawing Sheets

U.S. PATENT DOCUMENTS

| | | | |
|---|---|---|---|
| 5,528,571 A | 6/1996 | Funahashi et al. | |
| 5,553,045 A | 9/1996 | Obata et al. | |
| 5,577,194 A | 11/1996 | Wells et al. | |
| 5,608,715 A | 3/1997 | Yokogawa et al. | |
| 5,715,221 A | 2/1998 | Ito et al. | |
| 5,720,030 A | 2/1998 | Kamihara et al. | |
| 5,740,435 A | 4/1998 | Yamamoto et al. | |
| 5,745,444 A | 4/1998 | Ichikawa et al. | |
| 5,799,212 A | 8/1998 | Ohmori et al. | |
| 5,802,028 A | 9/1998 | Igarashi et al. | |
| 5,805,536 A | 9/1998 | Gage et al. | |
| 5,848,038 A | 12/1998 | Igarashi et al. | |
| 5,867,455 A | 2/1999 | Miyamoto et al. | |
| 5,914,928 A | 6/1999 | Takahashi et al. | |
| 5,940,702 A | 8/1999 | Sakao et al. | |
| 6,058,085 A | 5/2000 | Obata et al. | |
| 6,118,608 A | 9/2000 | Kakihara et al. | |
| 6,138,203 A | 10/2000 | Inokuchi et al. | |
| 6,160,778 A | 12/2000 | Ito et al. | |
| 6,189,118 B1 | 2/2001 | Sasaki et al. | |
| 6,233,654 B1 | 5/2001 | Aoki et al. | |
| 6,292,445 B1 | 9/2001 | Ito et al. | |
| 6,341,109 B1 | 1/2002 | Kayanuma et al. | |
| 6,341,278 B1 | 1/2002 | Yamamoto et al. | |
| 6,405,332 B1 | 6/2002 | Bando et al. | |
| 6,414,923 B1* | 7/2002 | Park et al. | 369/53.15 |
| 6,447,126 B1 | 9/2002 | Hornbeck | |
| 6,469,978 B1 | 10/2002 | Ohata et al. | |
| 6,477,126 B1 | 11/2002 | Park et al. | |
| 6,480,446 B1 | 11/2002 | Ko et al. | |
| 6,496,807 B1 | 12/2002 | Inokuchi et al. | |
| 6,529,458 B1* | 3/2003 | Shin | 369/53.17 |
| 6,542,450 B1 | 4/2003 | Park et al. | |
| 6,564,345 B1* | 5/2003 | Kim et al. | 714/723 |
| 6,581,167 B1 | 6/2003 | Gotoh et al. | |
| 6,606,285 B1 | 8/2003 | Ijtsma et al. | |
| 6,615,363 B1 | 9/2003 | Fukasawa et al. | |
| 6,631,106 B1 | 10/2003 | Numata et al. | |
| 6,633,724 B1 | 10/2003 | Hasegawa et al. | |
| 6,667,939 B1 | 12/2003 | Miyamoto et al. | |
| 6,671,249 B2 | 12/2003 | Horie et al. | |
| 6,697,306 B2 | 2/2004 | Sako et al. | |
| 6,724,701 B2 | 4/2004 | Ijtsma et al. | |
| 6,738,341 B2 | 5/2004 | Ohata et al. | |
| 6,754,860 B2 | 6/2004 | Kim et al. | |
| 6,760,288 B2 | 7/2004 | Ijtsma et al. | |
| 6,763,429 B1 | 7/2004 | Hirayama et al. | |
| 6,766,418 B1 | 7/2004 | Alexander et al. | |
| 6,785,206 B1 | 8/2004 | Lee et al. | |
| 6,795,389 B1 | 9/2004 | Nishiuchi et al. | |
| 6,804,797 B2 | 10/2004 | Ko et al. | |
| 6,826,140 B2 | 11/2004 | Brommer et al. | |
| 6,842,580 B1 | 1/2005 | Ueda et al. | |
| 6,845,069 B2 | 1/2005 | Nakahara et al. | |
| 6,883,111 B2 | 4/2005 | Yoshida et al. | |
| 6,918,003 B2 | 7/2005 | Sasaki et al. | |
| 6,934,236 B2 | 8/2005 | Lee et al. | |
| 6,999,398 B2 | 2/2006 | Yamamoto et al. | |
| 7,002,882 B2* | 2/2006 | Takahashi | 369/47.14 |
| 7,027,059 B2 | 4/2006 | Hux et al. | |
| 7,027,373 B2 | 4/2006 | Ueda et al. | |
| 7,042,825 B2 | 5/2006 | Yamamoto et al. | |
| 7,050,701 B1 | 5/2006 | Sasaki et al. | |
| 7,092,334 B2 | 8/2006 | Choi et al. | |
| 7,149,930 B2 | 12/2006 | Ogawa et al. | |
| 7,184,377 B2 | 2/2007 | Ito et al. | |
| 7,188,271 B2 | 3/2007 | Park et al. | |
| 7,233,550 B2 | 6/2007 | Park et al. | |
| 7,272,086 B2 | 9/2007 | Hwang et al. | |
| 7,289,404 B2 | 10/2007 | Park et al. | |
| 7,296,178 B2 | 11/2007 | Yoshida et al. | |
| 7,327,654 B2 | 2/2008 | Hwang et al. | |
| 7,349,301 B2 | 3/2008 | Terada et al. | |
| 7,379,402 B2 | 5/2008 | Ko et al. | |
| 2001/0009537 A1 | 7/2001 | Park | |
| 2001/0011267 A1 | 8/2001 | Kihara et al. | |
| 2001/0026511 A1 | 10/2001 | Ueda et al. | |
| 2001/0043525 A1* | 11/2001 | Ito et al. | 369/47.14 |
| 2002/0025138 A1 | 2/2002 | Isobe et al. | |
| 2002/0097665 A1 | 7/2002 | Ko et al. | |
| 2002/0097666 A1* | 7/2002 | Ko et al. | 369/275.3 |
| 2002/0099950 A1 | 7/2002 | Smith | |
| 2002/0136118 A1 | 9/2002 | Takahashi | |
| 2002/0136134 A1 | 9/2002 | Ito et al. | |
| 2002/0136537 A1 | 9/2002 | Takahashi | |
| 2002/0159382 A1* | 10/2002 | Ohata et al. | 369/275.3 |
| 2002/0161774 A1 | 10/2002 | Tol et al. | |
| 2002/0176341 A1 | 11/2002 | Ko et al. | |
| 2003/0072236 A1 | 4/2003 | Hirotsune et al. | |
| 2003/0095482 A1 | 5/2003 | Hung et al. | |
| 2003/0126527 A1 | 7/2003 | Kim et al. | |
| 2003/0135800 A1 | 7/2003 | Kim et al. | |
| 2003/0137909 A1 | 7/2003 | Ito et al. | |
| 2003/0137910 A1 | 7/2003 | Ueda et al. | |
| 2003/0142608 A1 | 7/2003 | Yamamoto et al. | |
| 2003/0149918 A1 | 8/2003 | Takaichi | |
| 2003/0173669 A1 | 9/2003 | Shau | |
| 2003/0198155 A1 | 10/2003 | Go et al. | |
| 2004/0001408 A1 | 1/2004 | Propps et al. | |
| 2004/0004917 A1 | 1/2004 | Lee | |
| 2004/0062159 A1 | 4/2004 | Park et al. | |
| 2004/0062160 A1 | 4/2004 | Park et al. | |
| 2004/0076096 A1 | 4/2004 | Hwang et al. | |
| 2004/0105363 A1 | 6/2004 | Ko et al. | |
| 2004/0114474 A1 | 6/2004 | Park et al. | |
| 2004/0120233 A1 | 6/2004 | Park et al. | |
| 2004/0125716 A1 | 7/2004 | Ko et al. | |
| 2004/0125717 A1 | 7/2004 | Ko et al. | |
| 2004/0136292 A1 | 7/2004 | Park et al. | |
| 2004/0145980 A1 | 7/2004 | Park et al. | |
| 2004/0158768 A1 | 8/2004 | Park et al. | |
| 2004/0174782 A1 | 9/2004 | Lee et al. | |
| 2004/0174785 A1 | 9/2004 | Ueda et al. | |
| 2004/0179445 A1 | 9/2004 | Park et al. | |
| 2004/0179458 A1 | 9/2004 | Hwang et al. | |
| 2004/0193946 A1 | 9/2004 | Park et al. | |
| 2004/0223427 A1 | 11/2004 | Kim et al. | |
| 2004/0246851 A1 | 12/2004 | Hwang et al. | |
| 2005/0007910 A1 | 1/2005 | Ito et al. | |
| 2005/0025007 A1 | 2/2005 | Park | |
| 2005/0052972 A1 | 3/2005 | Park | |
| 2005/0052973 A1 | 3/2005 | Park | |
| 2005/0055500 A1 | 3/2005 | Park | |
| 2005/0060489 A1 | 3/2005 | Park | |
| 2005/0068877 A1 | 3/2005 | Yeo | |
| 2005/0083740 A1 | 4/2005 | Kobayashi | |
| 2005/0083767 A1 | 4/2005 | Terada et al. | |
| 2005/0083830 A1 | 4/2005 | Martens et al. | |
| 2005/0195716 A1 | 9/2005 | Ko et al. | |
| 2005/0289389 A1 | 12/2005 | Yamagami et al. | |
| 2006/0077827 A1 | 4/2006 | Takahashi | |
| 2006/0195719 A1 | 8/2006 | Ueda et al. | |
| 2006/0203635 A1 | 9/2006 | Ko et al. | |
| 2006/0203638 A1 | 9/2006 | Ko et al. | |
| 2006/0203684 A1 | 9/2006 | Ko et al. | |
| 2006/0227694 A1 | 10/2006 | Woerlee et al. | |
| 2007/0294571 A1 | 12/2007 | Park et al. | |
| 2008/0046780 A1 | 2/2008 | Shibuya et al. | |

FOREIGN PATENT DOCUMENTS

| | | |
|---|---|---|
| CN | 1140897 C | 1/1997 |
| CN | 1227950 A | 9/1999 |
| CN | 1273419 A | 11/2000 |

| | | | | | | |
|---|---|---|---|---|---|---|
| CN | 1675708 A | 9/2005 | JP | 2001-023317 A | 1/2001 |
| CN | 1685426 A | 10/2005 | JP | 2001-069440 A | 3/2001 |
| DE | 199 54 054 A1 | 6/2000 | JP | 2001-110168 A | 4/2001 |
| EP | 0314186 A2 | 5/1989 | JP | 2001-351334 A | 12/2001 |
| EP | 0325823 A1 | 8/1989 | JP | 2001-357623 A | 12/2001 |
| EP | 0350920 A2 | 1/1990 | JP | 2002-015507 A | 1/2002 |
| EP | 0464811 A2 | 1/1992 | JP | 2002-015525 A | 1/2002 |
| EP | 0472484 A2 | 2/1992 | JP | 2002-056619 A | 2/2002 |
| EP | 0477503 A2 | 4/1992 | JP | 2002-215612 A | 8/2002 |
| EP | 0 556 046 A1 | 8/1993 | JP | 2002-245723 A | 8/2002 |
| EP | 0871172 A2 | 10/1998 | JP | 2002-288938 A | 10/2002 |
| EP | 0974967 A1 | 1/2000 | JP | 2002-329321 A | 11/2002 |
| EP | 0989554 A1 | 3/2000 | JP | 2002-352522 A | 12/2002 |
| EP | 0 997 904 A1 | 5/2000 | JP | 2003-536194 A | 12/2003 |
| EP | 1026681 B1 | 8/2000 | JP | 2004-280864 A | 10/2004 |
| EP | 1043723 A1 | 10/2000 | JP | 2004-280865 A | 10/2004 |
| EP | 1 132 914 A2 | 9/2001 | JP | 2005-535993 A | 11/2005 |
| EP | 1 148 493 A2 | 10/2001 | JP | 2005-538490 A | 12/2005 |
| EP | 1152414 A2 | 11/2001 | JP | 2005-538491 A | 12/2005 |
| EP | 1239478 A1 | 9/2002 | JP | 2006-519445 A | 8/2006 |
| EP | 1274081 A2 | 1/2003 | KR | 1020040094301 A | 11/2004 |
| EP | 1298659 A1 | 4/2003 | RU | 2005 103 626 | 9/2005 |
| EP | 1329888 A1 | 7/2003 | RU | 2005 127 337 | 2/2006 |
| EP | 1347452 A2 | 9/2003 | TW | 371752 | 10/1999 |
| EP | 1547065 A0 | 6/2005 | TW | 413805 | 12/2000 |
| EP | 1564740 A1 | 8/2005 | WO | WO-84/00628 A1 | 2/1984 |
| EP | 1573723 A0 | 9/2005 | WO | WO-96/30902 A1 | 10/1996 |
| EP | 1623422 A0 | 2/2006 | WO | WO-97/22182 A1 | 6/1997 |
| GB | 2356735 A | 5/2001 | WO | WO-00/54274 A1 | 9/2000 |
| JP | 63-091842 A | 4/1988 | WO | WO-01/22416 A1 | 3/2001 |
| JP | 01-263955 A | 10/1989 | WO | WO-01/93035 A2 | 12/2001 |
| JP | 2-23417 A | 1/1990 | WO | WO-03/007296 A1 | 1/2003 |
| JP | 05-274814 A | 10/1993 | WO | WO-03/025924 A1 | 3/2003 |
| JP | 06-349201 A | 12/1994 | WO | WO-03/079353 A1 | 9/2003 |
| JP | 08-096522 A | 4/1996 | WO | WO-2004/015707 A1 | 2/2004 |
| JP | 09-145634 A | 6/1997 | WO | WO-2004/015708 A1 | 2/2004 |
| JP | 09-231053 A | 9/1997 | WO | WO-2004/025648 | 3/2004 |
| JP | 10-050005 A | 2/1998 | WO | WO-2004/025649 | 3/2004 |
| JP | 10-050032 A | 2/1998 | WO | WO-2004/029668 A2 | 4/2004 |
| JP | 10-187356 | 7/1998 | WO | WO-2004/029941 A1 | 4/2004 |
| JP | 10-187357 | 7/1998 | WO | WO-2004/034396 A1 | 4/2004 |
| JP | 10-187358 | 7/1998 | WO | WO-2004/036561 A1 | 4/2004 |
| JP | 10-187359 | 7/1998 | WO | WO-2004/053872 A1 | 6/2004 |
| JP | 10-187360 | 7/1998 | WO | WO-2004/053874 A1 | 6/2004 |
| JP | 10-187361 A1 | 7/1998 | WO | WO-2004/068476 A1 | 8/2004 |
| JP | 11-110888 A | 4/1999 | WO | WO-2004/075180 A1 | 9/2004 |
| JP | 11-134809 | 5/1999 | WO | WO-2004/079631 | 9/2004 |
| JP | 11-203792 A | 7/1999 | WO | WO-2004/079740 A1 | 9/2004 |
| JP | 2000-090588 A | 3/2000 | WO | WO-2004/081926 A1 | 9/2004 |
| JP | 2000-149449 A | 5/2000 | WO | WO-2004/093035 A1 | 10/2004 |
| JP | 2000-195178 A | 7/2000 | WO | WO-2004/100155 A1 | 11/2004 |
| JP | 2000-215612 | 8/2000 | WO | WO-2004/100156 A1 | 11/2004 |
| JP | 2000-285607 A | 10/2000 | WO | WO-2005/004123 A1 | 1/2005 |
| JP | 2000-322875 A | 11/2000 | | | |

\* cited by examiner

METHOD FOR MANAGING DEFECTIVE AREA ON WRITE-ONCE OPTICAL RECORDING MEDIUM, AND OPTICAL RECORDING MEDIUM USING THE SAME

This application claims the benefit of Korean Applications No. 10-2002-0058516 filed on Sep. 26, 2002 and No. 10-2003-0001857 filed on Jan. 11, 2003, which are hereby incorporated by reference.

BACKGROUND OF THE INVENTION

1. Field of the Invention

The present invention relates to optical recording methods and media, and in particular, to a method for managing a defective area on a WORM-type optical recording medium, and an optical recording medium using the same. The method is particularly adapted for reproducing data recorded on write-once optical discs such as those using the recently developed Blu-ray disc format known as BD-WO.

2. Discussion of the Related Art

Data recording devices and media using optical read/write means have generally been categorized according to their writing capability or flexibility. Among read-only optical recording media, there are those using CD-ROM and DVD-ROM formats, which have no write capability. Among known disc standards that allow multiple write operations to be freely performed, there are CD-RW, DVD-RAM, DVD-RW, and DVD+RW types, which are rewritable compact discs and digital versatile discs.

WORM-type discs, on the other hand, are adopted for use as data storage devices requiring large storage capacity. Such discs, however, have limited recording flexibility and are for use in write-once read-many applications. These include CD-R and DVD-R types, which are recordable compact discs and digital versatile discs.

Meanwhile, a new type of high-density DVD, known as a Blu-ray disc, which is a large-capacity optical disc for recording high-quality audio and video data using a blue-violet laser, has been developed. The Blu-ray disc adopts a rewritable disc format known as BD-RE.

In the above types of optical recording media, surface imperfections and defects are generated during their manufacture, handling, or use. Accordingly, a method for managing the defective areas is used during a data recording operation, so that data reproduction can be carried out normally.

Referring to FIG. 1, an optical disc recording/reproducing device 100 for use with an optical recording medium 102, such as a BD-RE formatted disc, receives a data/ command input from a host (or controller) 200. The optical disc recording/reproducing device 100 is provided with an optical pickup 104 for writing/reading data to/from an inserted optical recording medium, a pickup servo 106 for controlling the optical pickup to achieve proper tracking and to maintain a controlled distance with respect to the surface of the optical recording medium, a data processor 108 for processing data to and from the optical pickup by restoring to a desired signal value a reproduction signal received from the optical pickup or by modulating a recording signal received from the host for transfer to the disc, an interface 110 for transferring data between the host and the recording/reproducing device, a microcomputer 112 for controlling the recording/reproducing device, and a memory 114 for storing a program and for temporarily storing various information including defect management information and data. Under the control of the host 200 and stored programming, the optical pickup 104 reads data stored (or written) on a disc, providing a data signal input to the data processor 108 for reproduction processing and output, and writes data onto specified areas of the disc using a write signal output from the data processor. During a write operation, the optical disc recording/reproducing device 100 receives a data stream (or an encoded analog signal) and outputs the write signal to the optical pickup 104 in accordance with a command input via the host 200 and the program stored in the memory 114 and executed by the microcomputer 112.

Referring to FIG. 2, a BD-RE type disc for use with the device of FIG. 1 is divided into assigned areas. The assigned areas essentially comprise a data area set between a lead-in area (LIA) and a lead-out area (LOA). The data area includes an inner spare area (ISA) adjacent the lead-in area and an outer spare area (OSA) adjacent the lead-out area.

As above, the optical disc recording/reproducing device 100 processes input data from a host 200 and writes the data onto an optical disc in clusters corresponding to an error correction code block unit. If during a write operation the existence of a defective area is detected in the data area, the optical disc recording/reproducing device 100 carries out a series of replacement write operations to write a data cluster corresponding to the detected defective area in one of the two spare areas (shown in the example of FIG. 2 as the ISA). Therefore, by writing a data cluster of a defective area in a spare area instead of the defective area, the data can be read and reproduced from the spare area, thus preventing the occurrence of writing errors even when an optical disc exhibits defects in the data area and thereby assuring data security and data integrity.

The above method is carried out using an optical recording medium that allows free access to the data recording areas, since a rewritable disc is used. Therefore, in managing the data of the defective areas, the optical disc recording/reproducing device has unlimited use of the recording area. If a WORM-type disc is used, however, the write operation is performed only once and must be completed before normal data retrieval operations by the user can be carried out. Moreover, write operations and, in particular, replacement write operations—must be enabled for the management of defects generated after recording and detected during the reproduction of a recorded WORM-type disc.

For example, another type of Blu-ray disc, using a format known as BD-WO, has been recently developed. The BD-WO type disc, which is a write-once type disc, cannot make use of known methods for managing a defective area on the disc, since the standardization of this type of disc format has only recently begun. An immediate solution is required.

SUMMARY OF THE INVENTION

Accordingly, the present invention is directed to a method for managing a defective area on a write-once optical recording medium, such as an optical disc or BD-WO, that substantially obviates one or more of the problems due to limitations and disadvantages of the related art.

An object of the present invention, which has been devised to solve the foregoing problem, lies in providing a method for managing a defective area on a write-once optical recording medium, by which data written in and read from a defective area of the disc is relocated (rewritten), and then managed, through the performance of a replacement write operation in which the data is written in an alternative data area (spare area) corresponding to the defective area.

It is another object of the present invention to provide a method for managing a defective area on a write-once optical recording medium, by which normal data reproduction can be achieved after a data recording operation is completed, irrespective of the existence of one or more defective areas detected during data reproduction (read) operations.

It is another object of the present invention to provide data security and data integrity in using a write-once optical recording medium, particularly during data reproduction operations using a host computer reading from a BD-WO disc and employing a linear replacement technique during data recording.

It is another object of the present invention to provide a method for managing a defective area on a write-once optical recording medium, by which BD-WO standardization is facilitated.

It is another object of the present invention to provide an optical recording medium suitable for adopting the above method.

It is another object of the present invention to provide a system suitable for utilizing an optical recording medium adopting the above method.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided a method for managing a defective area of a write-once optical recording medium having a data area and a lead-in area, comprising steps of firstly writing replacement data in a predetermined area, the replacement data corresponding to a defective area detected during a data reproduction operation; and secondly writing locator information in the predetermined area, the locator information indicating respective positions of the defective area and the corresponding replacement data. Preferably, the method further comprises a step of thirdly writing a supplementary access pointer in the lead-in area, the access pointer for accessing the locator information written in the predetermined area. The predetermined area is a supplementary spare area assigned to one end of the data area, where the locator information is written as supplementary defect list information. On the other hand, the predetermined area may be located before the data area, i.e., in the lead-in area, so as to include both first and second defect lists, i.e., a conventional defect list and a supplementary defect list. In the operation of an optical recording medium adopting the method of the present invention, the disc definition structure information is first read to search the supplementary defect list by referring to the physical sector number of the supplementary defect list, and the supplementary defect entries of the supplementary defect list are then accessed and read to locate the replacement data.

In another aspect of the present invention, there is provided a write-once optical recording medium comprising a data area; a lead-in area disposed adjacent the data area; a defect management area, located in the lead-in area, for writing disc definition structure information including a plurality of write locations for accessing defect list information pertaining to a data recording stage; and a supplementary spare area, located at one end of the data area, for writing a plurality of replacement clusters pertaining to a data reproducing stage. Preferably, the defect list information is written in the data area or in the lead-in area, and supplementary defect list information is written in the supplementary spare area or in the lead-in area.

In another aspect of the present invention, there is provided a system having a programmable device for optically recording/reproducing data to/from a write-once optical recording medium. The device can be programmed to perform the necessary steps of the method of the present invention, including those of recording data and reproducing recorded data.

Adoption of the method of the present invention for an optical recording medium such as a BD-WO disc assures data security and data integrity, particularly during data read operations using a host computer employing a linear replacement technique.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Throughout the drawings, like elements are indicated using the same or similar reference designations.

Figure 3:
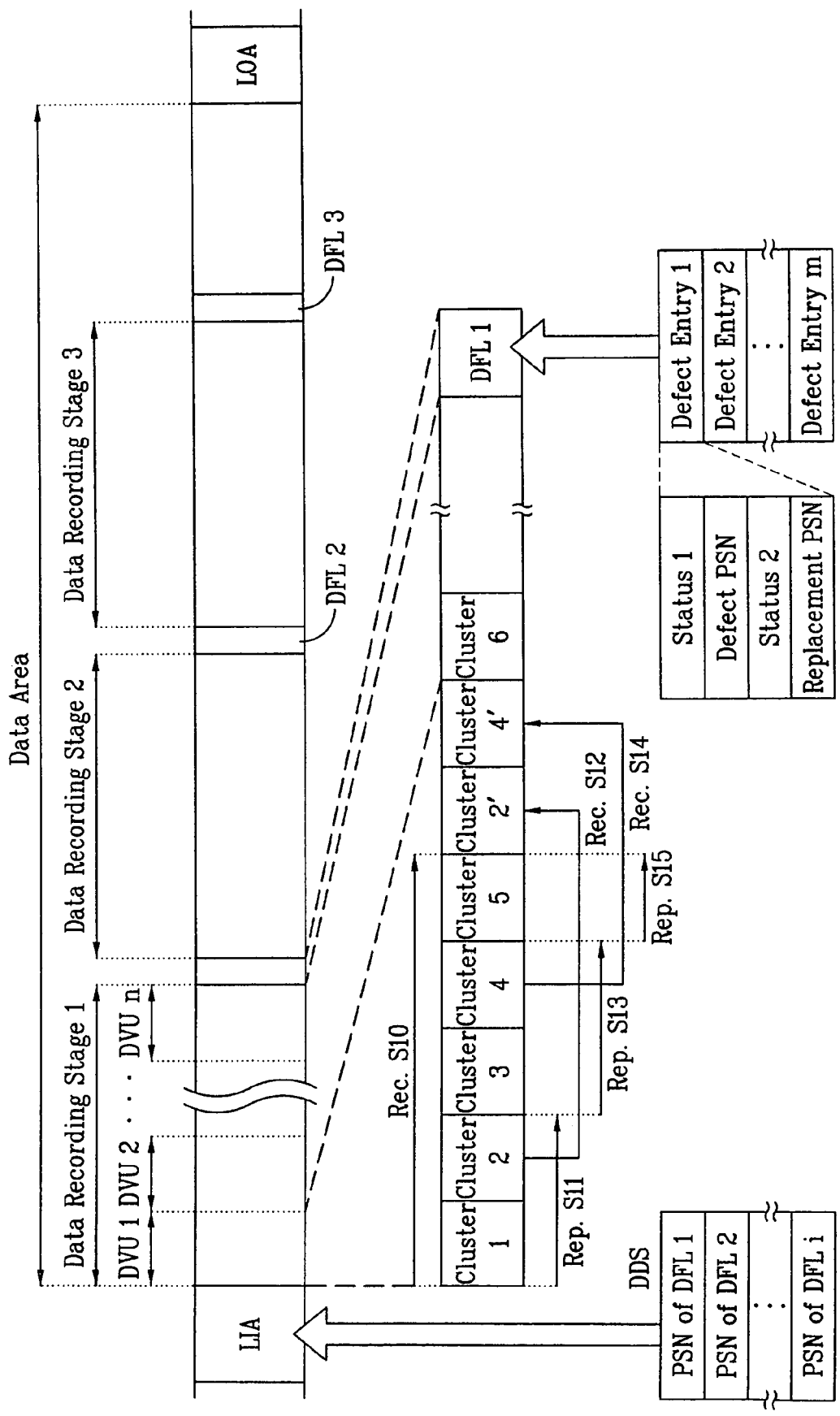
FIGS. 3-5 are diagrams respectively illustrating methods for managing a defective area on a BD-WO disc at the time of recording data in accordance with the present invention.

As shown in FIG. 3, a BD-WO disc adopting the method of the present invention has a lead-in area (LIA), a data area, and a lead-out area (LOA). At the time of recording data using the BD-WO disc of FIG. 3, the optical disc recording/reproducing device 100 of FIG. 1 writes data in a temporally continuous manner on a predetermined writing sector in the user data area (not shown) of the data area. The write operation progresses until data recording ends or until the last recording sector has been recorded. Each instance of writing will be referred to as a data recording stage.

The predetermined writing sector is set as a defect verification unit (DVU) by which, during the data recording stage, a defective area is detected using a verify-after-write operation performed after each DVU. One DVU may have a recording size equivalent to any number of physical tracks or clusters, and for the sake of convenience in describing the embodiments of the present invention, this recording size has been arbitrarily set to five clusters. Actual DVU size, however, is determined only upon completion of a recording operation, such that completion of a recording operation S10 determines the size of a DVU 1. A plurality of defect verification units (DVU 1 through DVU n) make up one instance of recording or a data recording stage having a temporal continuity, and each of data recording stages 1, 2, and 3 are made up of a number of DVUs dependent on the amount of data being recorded.

The verify-after-write operation is performed by the optical disc recording/ reproducing device 100, which executes a repetitious series of detecting operations to determine the presence of defective areas corresponding to the written data of one DVU. In each defective area detecting operation, the data written in the DVU is reproduced to verify its recording status; that is, it is determined whether the data was written successfully such that normal reproduction is possible. If normal reproduction cannot be verified, it is determined that a defect is present.

For example, after sequentially and continuously writing data in physical clusters 1-5 of the DVU 1 through the recording operation S10, the optical disc recording/ reproducing device 100 performs a verify-after-write operation by progressively reproducing the data written in the DVU 1, to verify normal reproduction and thereby detect the presence of any defective areas. In progressively reproducing, the optical disc recording/reproducing device 100 sequentially reads the data as written, starting again from the first (or next in position) cluster and reading continuously until detection of the first (or next) occurrence of an unverifiable data cluster through a reproducing operation S11, indicating the presence of a defective area in, say, the physical cluster 2. Then, the optical disc recording/reproducing device 100 temporarily stores in its memory 114 the data of the physical cluster 2. The temporarily stored (buffered) data is used to carry out a replacement write operation through a recording operation S12, whereby replacement data corresponding to the defective cluster is written as a replacement cluster 2 in succession to the DVU's last physical cluster, i.e., after the physical cluster 5, as part of the DVU 1.

After the completion of a replacement write operation as above, the optical disc recording/reproducing device 100 continues reproducing the data of the DVU 1 through a reproducing operation S13, progressing to the next cluster, i.e., to the physical cluster 3. When another defective area is detected in, say, the physical cluster 4, the optical disc recording/reproducing device 100 carries out another replacement write operation through a recording operation S14, in which the data of the defective cluster is buffered and then written as a replacement cluster 4 in succession to the replacement cluster 2.

A continuation of the verify-after-write operation for DVU 1 through a reproducing operation S15 may find no further defective areas, which completes the data recording of DVU 1 for the data recording stage 1. Thus, the DVU 1 ultimately contains the data of the physical clusters 1, 3, and 5, two defective areas, and replacement clusters 2 and 4 corresponding to the defective areas, spanning seven clusters in all. The same process is repeated for each DVU until the conclusion of the data recording stage 1 by the execution of recording and verify-after-write operations for the DVU n. In doing so, a physical cluster 6 is written as the first cluster of the DVU 2.

Thereafter, i.e., in succession to a completed verify-after-write operation for the DVU n, the optical disc recording/reproducing device 100 writes locator information for identifying each defective area and locating the corresponding replacement data. The locator information is written as defect list (DFL) information including a plurality of defect entries (defect entry 1 through defect entry m) expressed as a pair of physical sector numbers or PSNs. Each defect entry is in essence a correlation of a defect PSN and a replacement PSN, where a defect PSN is the physical sector number of a defective area and the replacement PSN is the physical sector number of the replacement data area. Thus, the DFL 1 corresponds to the data recording stage 1 and is written in succession to the DVU n of the data recording stage 1. In the event of further data recording stages, the corresponding locator information is written in respective DFLs in succession to each DVU n of the latest (most recent) data recording stage.

Meanwhile, the optical disc recording/reproducing device 100 writes disc definition structure (DDS) information in the LIA. The DDS information includes the physical sector number for locating a given defect list, referred to as the PSN of a DFL, which is used in accessing the locator information of the defect list. The DDS information includes the PSNs of the DFL for each data recording stage, that is, the PSN of the DFL 1 to the PSN of a DFL i. Thus, in a read operation to reproduce data recorded on a BD-WO type disc, the optical disc recording/reproducing device 100 first refers to the LIA to read the DDS information and thereby search the DFL and its defect entries, which enables the replacement data corresponding to a defective area to be located, read, and reproduced.

Figure 4:
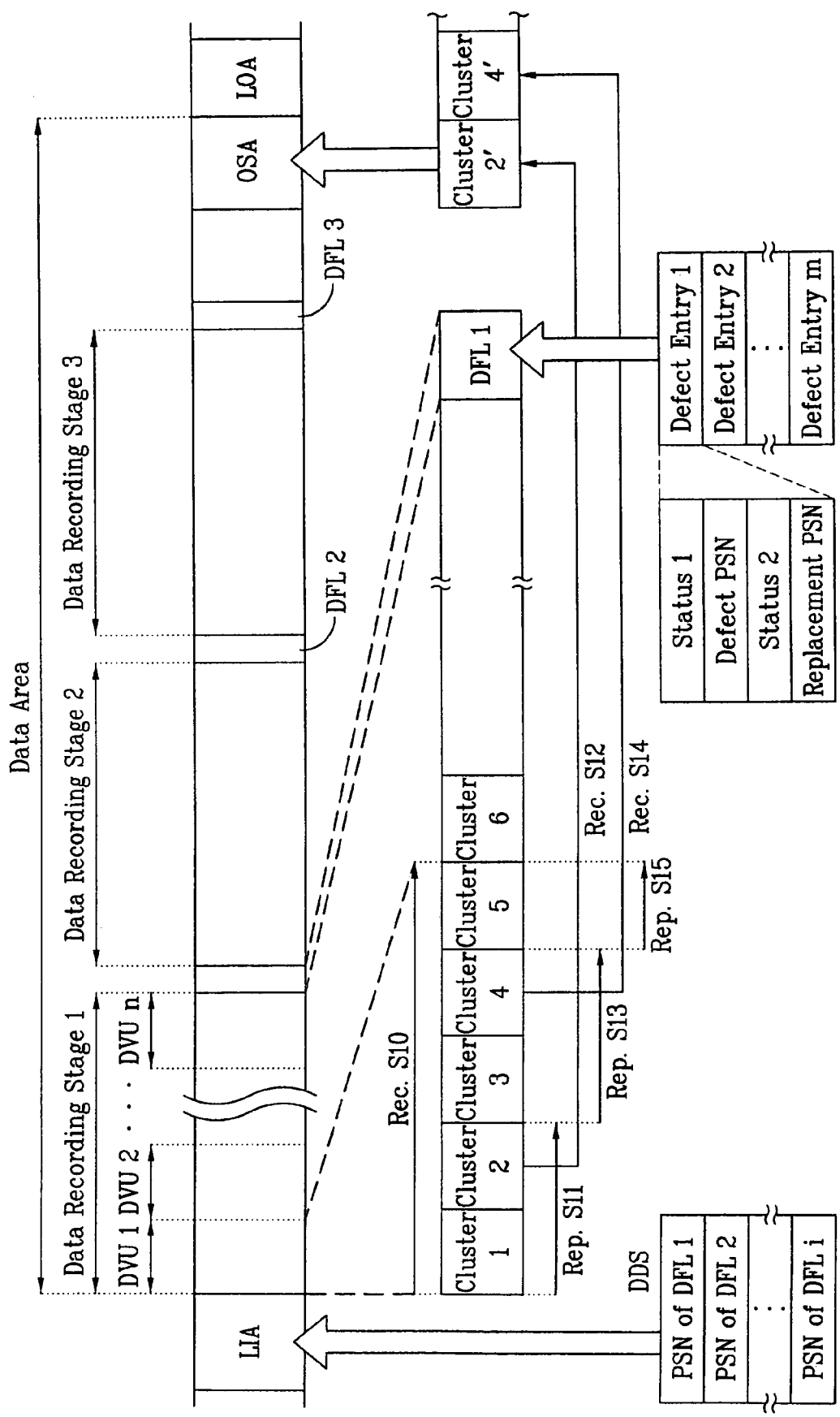

FIG. 4 illustrates a diagram showing another method for managing a defective area on a BD-WO disc at the time of recording data in accordance with the present invention, in which a spare area is additionally provided at one end of the data area. In this case, the spare area is assigned as an outer spare area (OSA). For the sake of convenience, the DVU recording size is again set to five physical clusters and defective areas are detected in the same clusters during a verify-after-write operation using the same reproducing and recording operations. That is, after the verify-after-write operation is performed for the physical clusters of a DVU 1, in which a defective area is detected in physical clusters 2 and 4, the optical disc recording/reproducing device 100 performs respective replacement write operations for the data of the defective clusters. In this case, however, the replacement data is written in the OSA.

The resulting DVU 1, having two defective clusters, contains the normally written data of physical clusters 1, 3, and 5, while the OSA contains the replacement data of replacement clusters 2 and 4 corresponding to the two defective clusters. A data recording stage 1 continues accordingly for a DVU 2 through a DVU n, and the optical disc recording/reproducing device 100 writes the locator information in succession to the DVU n as a DFL 1. The optical disc recording/reproducing device 100 writes DDS information in the LIA, including the PSNs of the DFL 1 to a DFL i for accessing every entry of the locator information.

Figure 5:
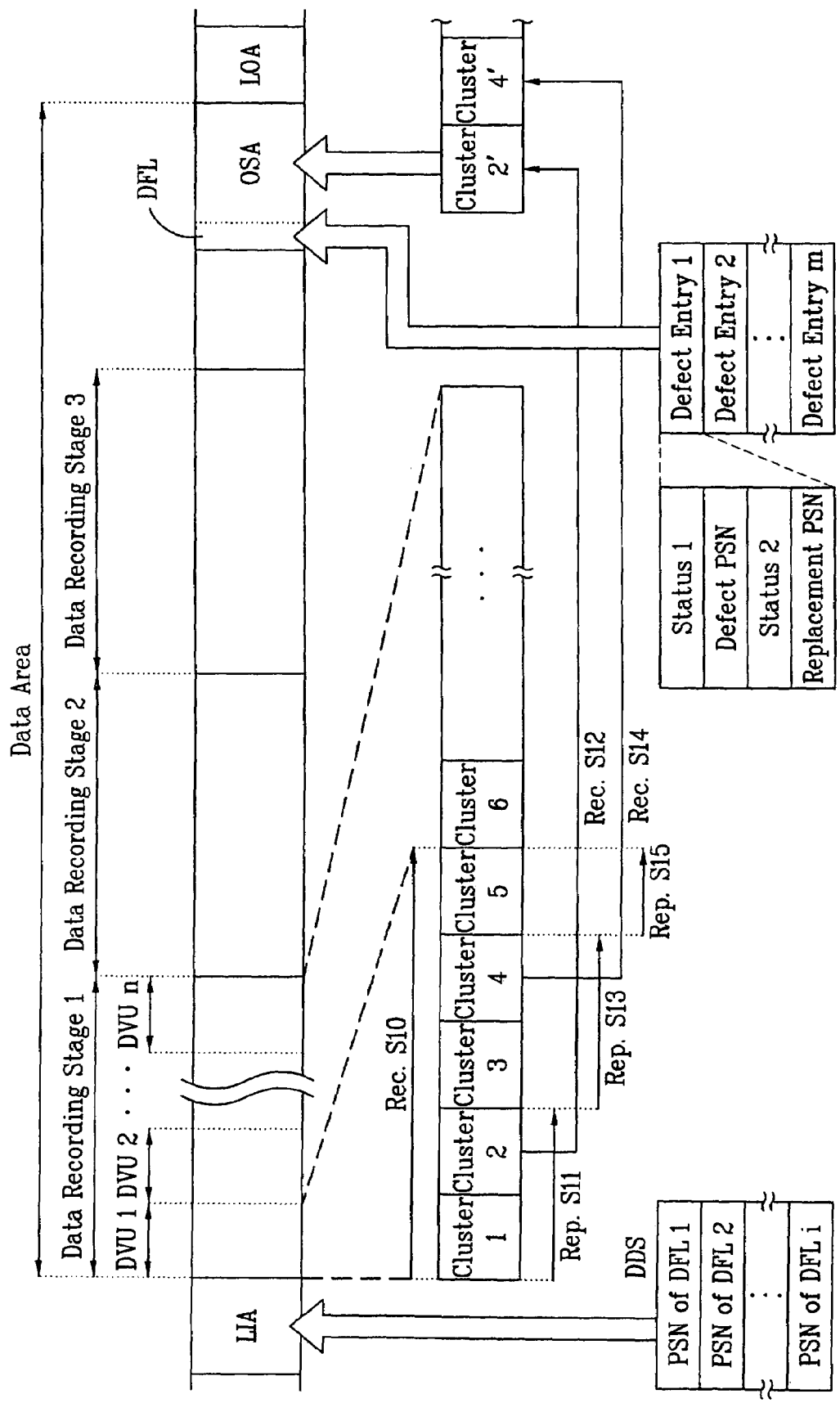

On the other hand, as shown in FIG. 5, the optical disc recording/reproducing device 100 may, during recording, write the DFL information in the OSA of a BD-WO disc, instead of in succession to the DVU n of each data recording stage. In doing so, though the drawings show the DFL area at one end of the OSA, the DFL information may be progressively written starting from either end or may be written centrally together with the replacement clusters, using outwardly progressing write operations. In any event, data reproduction is nonetheless the same.

At the time of data reproduction, the optical disc recording/reproducing device 100 first reads the DDS information in the LIA to obtain the PSNs for each DFL and then searches the corresponding DFL, and with reference to the replacement PSN and defect PSN of the defect entries, the replacement data can be normally reproduced from the OSA or from any predetermined data write sector. Here, first reading the DDS information will determine the write location of the DFL information, whether inside or outside the data area.

Figure 6:
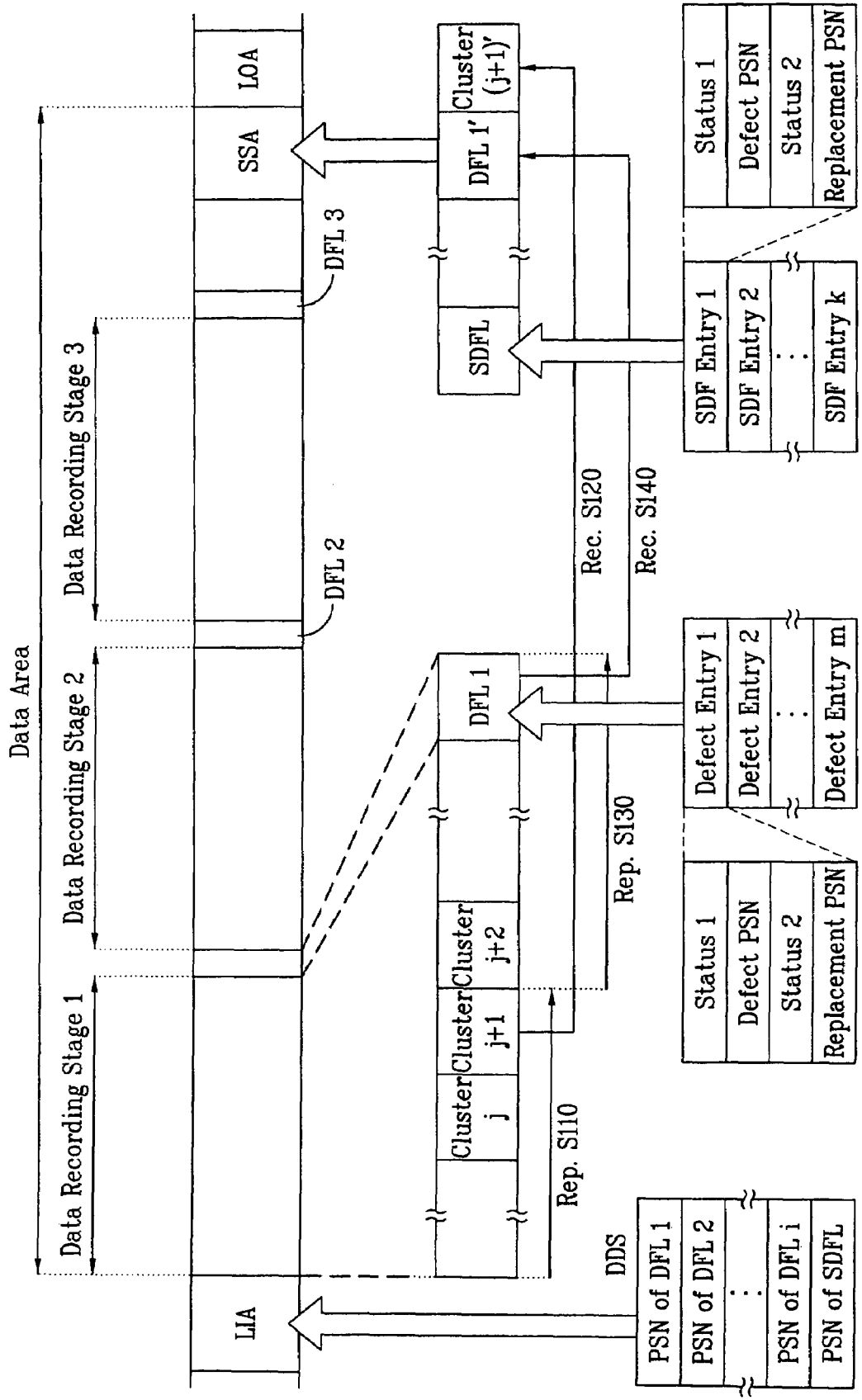
FIG. 6 is a diagram illustrating a method for managing a defective area on a BD-WO disc at the time of data reproduction, according to a preferred embodiment of the present invention.

FIG. 6 is a diagram illustrating a method for managing a defective area on a BD-WO disc at the time of data reproduction, according to a preferred embodiment of the present invention. In FIG. 6, a supplementary spare area (SSA) is assigned to one end of the data area, i.e., next to the LIA or LOA, of a BD-WO adopting the method of the present invention.

In reproducing recorded data, the optical disc recording/reproducing device 100 carries out a series of read operations in which the DFL is searched by reading the DDS information written in the LIA, to reproduce the replacement data written in a spare area, or in any alternative data area (e.g., the SSA), by referring to the defect entry on the defect list. During such a data reproduction operation, additional defective areas may be newly found, either in a data recording area or in one or more of the defect lists.

In the BD-WO disc shown in FIG. 6, a new defective area is detected during a data reproduction operation. A new defective area is one not found in an earlier data recording operation. If a new defective area is detected in a physical cluster j+1 while reproducing data through a reproducing operation S110, a recording operation S120 is performed to carry out a replacement write operation and thereby record in the supplementary spare area the data of the defective cluster. After the replacement write operation, data reproduction progresses to a physical cluster j+2 and continues accordingly until completion of the recording stage 1 through a reproducing operation S130. When a defective area is next detected, say, in a DFL 1, the defect list is replaced through a recording operation S140 by recording a replacement DFL 1 in the supplementary spare area in succession to the replacement clusters for any newly detected defective clusters. Here, all clusters of a given DFL may be wholly replaced or the clusters may be selectively replaced. In any case, during data reproduction, the locator information corresponding to all newly detected defective areas is stored in the supplementary spare area as a supplementary defect list (SDFL) for defect area management during data reproduction.

The supplementary DFL includes a plurality of supplementary defect (SDF) entries, SDF entry 1 through SDF entry k, and each supplementary defect entry includes a defect PSN, a replacement PSN, and status information. The status information is comprised of status 1 and status 2 information, with the status 2 information going unused in the present embodiment. The status 1 information indicates the type of relationship existing between a defective or potentially defective area and any replacement data corresponding thereto, including replacement data recording status, replacement data address assignment, defective area confirmation, replacement area availability, and the like.

Meanwhile, the optical disc recording/reproducing device 100 may also write in the LIA a supplementary access pointer for directly accessing the supplementary DFL. The supplementary access pointer is a field of the DDS information, containing a physical sector number corresponding to the supplementary DFL.

As shown in FIG. 6, the supplementary spare area at a current stage of data reproduction, which encountered a new defective area at the cluster j+1 and at least one defective cluster in the DFL 1, contains a replacement cluster (j+1), a replacement DFL 1, and the supplementary DFL. At this stage, the supplementary DFL contains corresponding defect entries accordingly, with additional clusters of replacement data being written in the supplementary spare area in succession progressively as data reproduction continues. While a given DFL corresponds to each instance of data recording, i.e., to respective data recording stages, the supplementary DFL corresponds to the reproduction of any portion of the disc.

Figure 1:
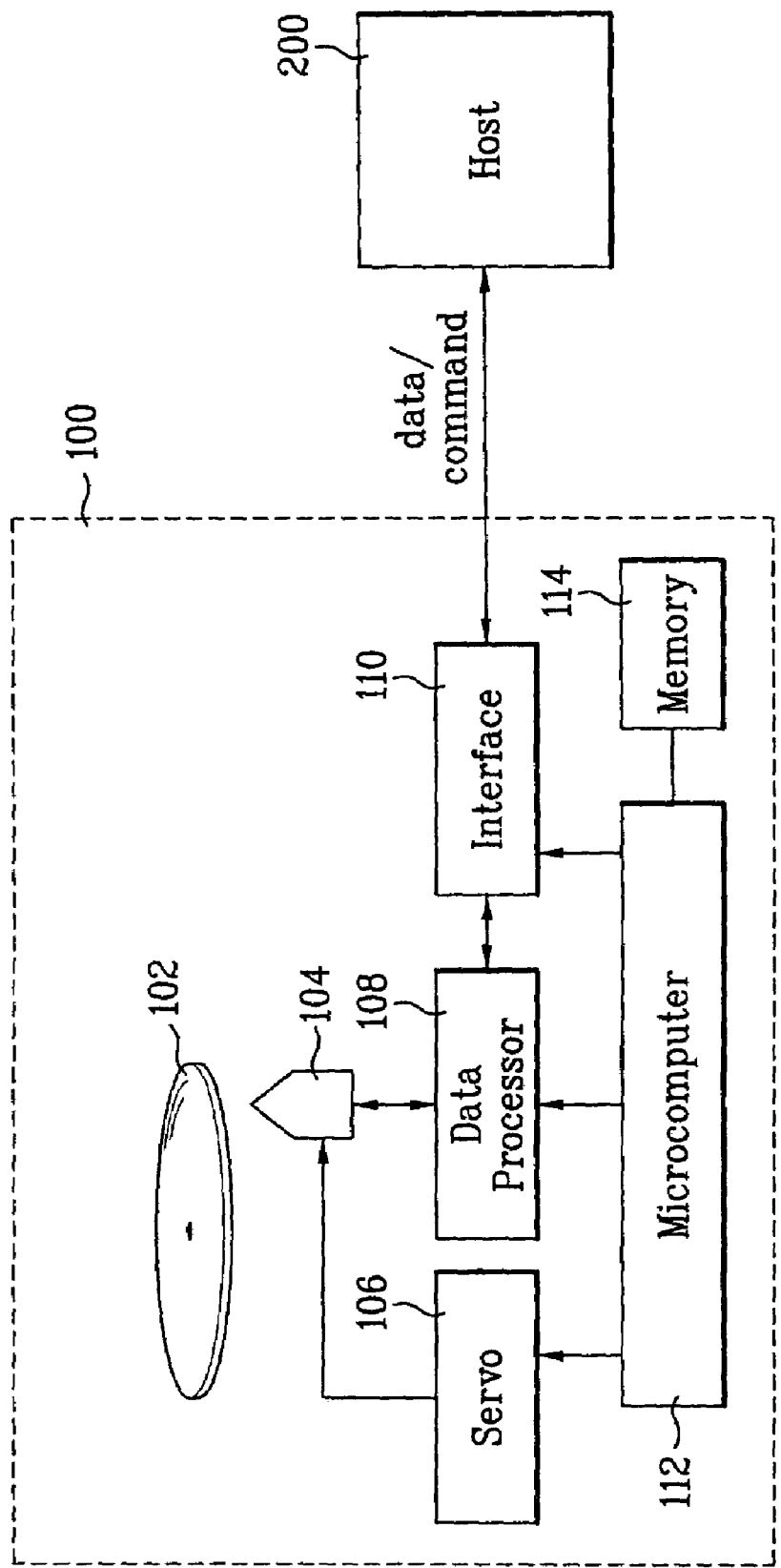
FIG. 1 is a block diagram of an optical disc recording/reproducing system of a related art.
Figure 2:
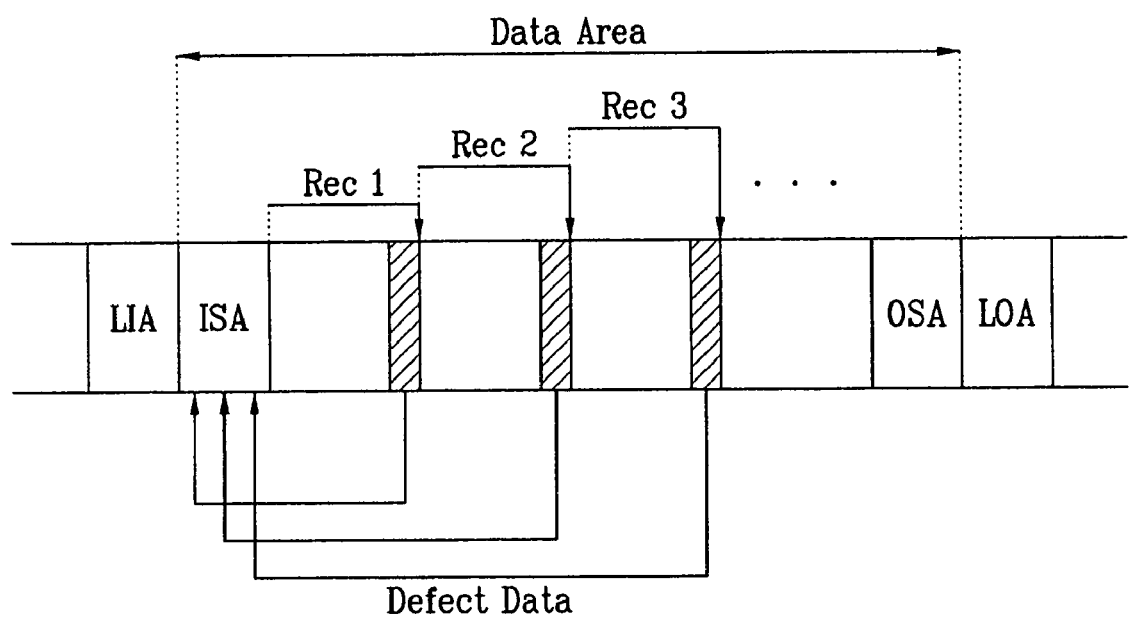
FIG. 2 is a diagram of a method for managing a defective area on a BD-RE disc for use in the system of FIG. 1.

At the time of data reproduction using an optical recording medium such as a BD-WO type disc, the disc is placed into a programmable system such as that shown in FIG. 1, the optical disc recording/reproducing device 100 first reads the DDS information in the LIA, to search the supplementary DFL by referring to the physical sector number of the supplementary DFL. The SDF entries of the supplementary DFL are accessed and read, to locate the replacement data corresponding to a defective area newly detected during reproduction. Here, though the drawings show the supplementary DFL area at one end of the supplementary spare area, the supplementary DFL information may be progressively written starting from either end or may be written centrally together with any newly detected replacement clusters, using outwardly progressing write operations.

While the method according to FIG. 6 is adapted for a BD-WO disc having both DFL and SDFL information stored inside the data area, the same scheme for defective area management and normal data reproduction is nonetheless adaptable for a BD-WO disc utilizing the LIA for DFL storage, i.e., where the DFL and SDFL information are stored outside the data area. Accordingly, the replacement data can be normally reproduced from the SSA or from any predetermined data write sector, by first reading the DDS information to determine the write location of the SDFL information, whether inside or outside the data area.

Figure 7:
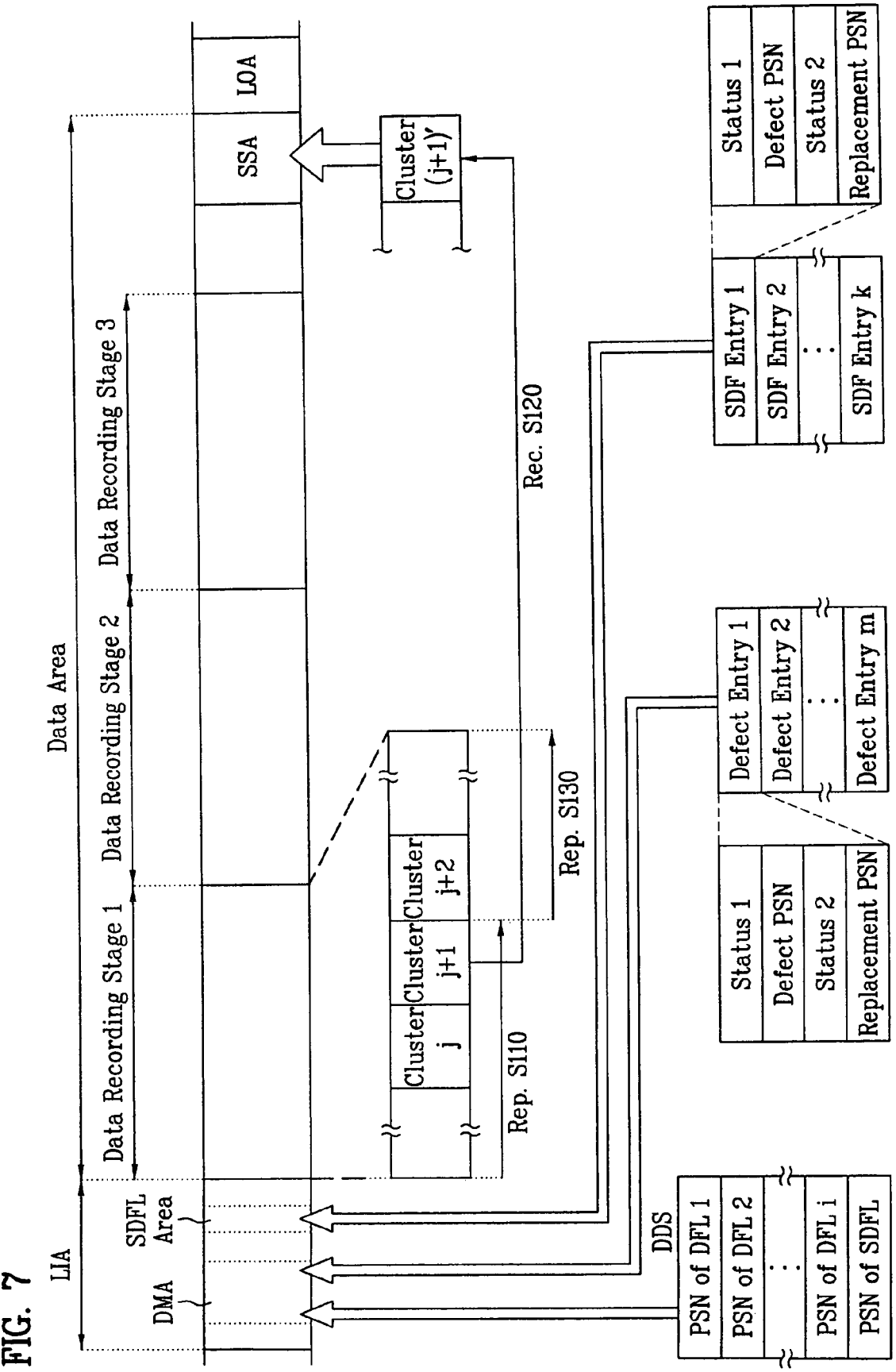
FIG. 7 is a diagram illustrating a method for managing a defective area on a BD-WO disc at the time of data reproduction, according to another preferred embodiment of the present invention.

FIG. 7 is a diagram illustrating a method for managing a defective area on a BD-WO disc at the time of data reproduction, according to another preferred embodiment of the present invention, wherein the DFL and SDFL are stored in a predetermined writing sector before the data area, for example, in the LIA. Thus, the DFL and SDFL information are stored outside the data area.

Figure 8:
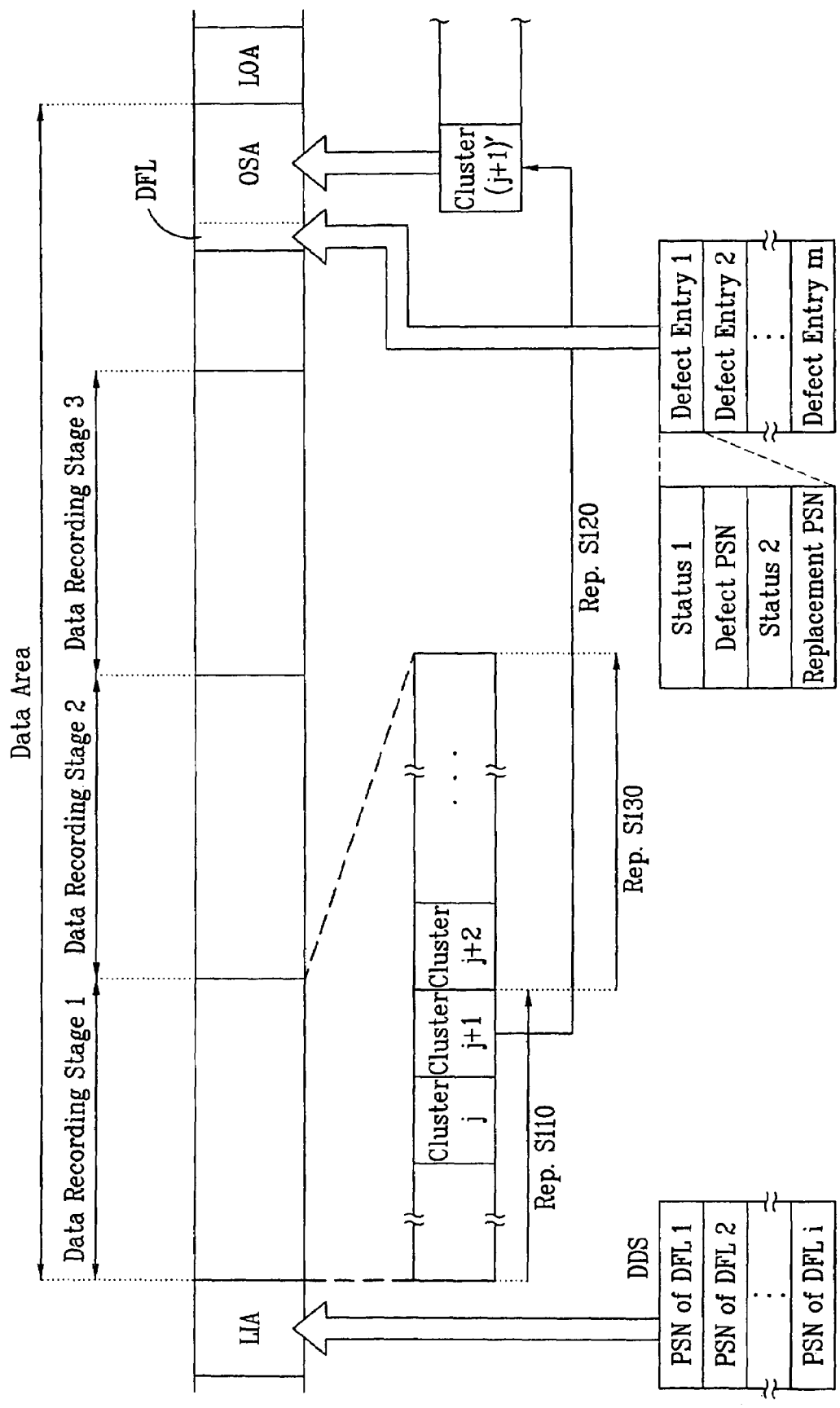
FIG. 8 is a diagram illustrating a method for managing a defective area on a BD-WO disc at the time of data reproduction, according to yet another preferred embodiment of the present invention.

FIG. 8 is a diagram illustrating a method for managing a defective area on a BD-WO disc at the time of data reproduction, according to yet another preferred embodiment of the present invention, which correlates to the recording operation shown in FIG. 5, which has no supplementary DFL. Here, a new defective area is detected during a data reproduction operation, where a cluster j+1 is determined to be defective as in FIGS. 6 and 7, but its replacement cluster j+1) is written in the OSA together with the DFL. Thus, the method according to this embodiment enables the use of a more conventional disc structure to effect defect management, i.e., without a separately designated area for replacement recording, for use during recording and reproduction operations alike.

As described above, the method for managing a defective area of a write-once optical recording medium, such as BD-WO type disc, permits the normal reading of data written on a defective area of the disc, by writing the data as replacement data on a spare area or other data area during a data reproduction operation and then managing the replacement data. The method prevents the occurrence of fatal reproduction errors, such as that caused by damage to the DFL information, and manages new defective areas that may be detected at the time of a data read operation, thereby assuring data security and data integrity. Moreover, adoption of the method of the present invention will facilitate BD-WO standardization by providing a suitable write-once optical recording medium whereby recorded data can be read even if further defective areas are newly detected during a data read operation and whereby the newly detected defective areas can be managed.

It will be apparent to those skilled in the art that various modifications and variations can be made in the present invention without departing from the spirit or scope of the invention. Thus, it is intended that the present invention cover such modifications and variations provided they come within the scope of the appended claims and their equivalents.

What is claimed is:

1. A method for managing a defective area of a recording medium having a data area, a lead-in area and a lead-out area, the method comprising:

detecting a defective unit during reproducing or recording operation;

recording the data of the defective unit in a replacement unit; and recording defect management information in a defect management area, wherein the defect management area includes a first part and a second part, the first part is used to record therein defect management information generated during a recording operation and the second part is used to record therein defect management information generated during a reproducing operation, wherein the defect management information generated during the recording operation includes position information of a defective unit and a corresponding replacement unit, and the defect management information generated during the reproducing operation includes position information of a defective unit and a corresponding replacement unit, and wherein the method further comprises recording a first access pointer and a second access pointer in the defect management area, the first access pointer indicating a position of the defect management information recorded in the first part and the second access pointer indicating a position of the defect management information recorded in the second part.

2. The method as claimed in claim 1, wherein the first and the second parts of the defect management area are assigned in the lead-in area respectively.

3. The method as claimed in claim 2, wherein the replacement unit is included in a spare area, and the spare area is assigned in the data area.

4. The method as claimed in claim 1, wherein the first and second parts are assigned in the data area.

5. A method for managing a defective area of a recording medium having a data area, a lead-in area and a lead-out area, the method comprising:

detecting a defective unit during reproducing or recording operation;

recording the data of the defective unit in a replacement unit;

recording a defect entry in a defect management area, the defect entry including locator information indicating positions of the defective unit and the replacement unit; and recording an access pointer in the defect management area, the access pointer indicating position of defect management information including the defect entry, wherein the defect management area includes a first part and a second part, the first part is used to record therein defect management information generated during a recording operation and the second part is used to record therein defect management information generated during a reproducing operation, wherein the defect management information generated during the recording operation includes position information of a defective unit and a corresponding replacement unit, and the defect management information generated during the reproducing operation includes position information of a defective unit and a corresponding replacement unit, and wherein the method further comprises recording a first access pointer and a second access pointer in the defect management area, the first access pointer indicating a position of the defect management information recorded in the first part and the second access pointer indicating a position of the defect management information recorded in the second part.

6. The method as claimed in claim 5, wherein the first and the second parts are assigned in the lead-in area respectively.

7. The method as claimed in claim 5, wherein the replacement unit is included in a spare area, and the spare area is assigned in the data area.

8. The method as claimed in claim 5, wherein the first and second parts are assigned in the data area.

9. A recording medium comprising:

a data area including a spare area, the spare area including a replacement area;

a lead-in area; and a defect management area, the defect management area including a first part and a second part, wherein the first part is used to record therein defect management information generated during a recording operation, and the second part is used to record therein defect management information generated during a reproducing operation, wherein the defect management information generated during the recording operation includes position information of a defective unit and a corresponding replacement unit, and the defect management information generated during the reproducing operation includes position information of a defective unit and a corresponding replacement unit, and wherein the defect management area is configured to store therein a first access pointer and a second access pointer, the first access pointer indicating a position of the defect management information recorded in the first part and the second access pointer indicating a position of the defect management information recorded in the second part.

10. The recording medium as claimed in claim 9, wherein the second part of the defect management area is assigned in the lead-in area, and the first part and the second part of the defect management area are assigned separately.

11. The recording medium as claimed in claim 9, wherein the second part of the defect management area is assigned in the data area, and the second part of the defect management area includes at least one sub defect management area.

12. The recording medium as claimed in claim 9, wherein the first and second parts are assigned in the data area.

13. A method for managing a defective unit of a recording medium having a data area, a lead-in area and a lead-out area, the method comprising:

detecting a defective unit during reproducing or recording operation;

recording the data of the defective unit in a spare area; and recording defect management information in a defect management area, the defect management area including a first part and a second part, the time for using the first part being different from the time for using the second part, wherein the first part is used to record therein defect management information generated during a recording operation, and the second part is used to record therein defect management information generated daring a reproducing operation, wherein the defect management information generated during the recording operation includes position information of a defective unit and a corresponding replacement unit, and the defect management information generated during the reproducing operation includes position information of a defective unit and a corresponding replacement unit, and wherein the method further comprises recording a first access pointer and a second access pointer in the defect management area, the first access pointer indicating a position of the defect management information recorded in the first part and the second access pointer indicating a position of the defect management information recorded in the second part.

14. The method as claimed in claim 13, wherein the first part and the second part of the defect management area are assigned in the lead-in area separately.

15. The method as claimed in claim 13, wherein the first part of the defect management area is assigned in the lead-in area and the second part of the defect management area is assigned in the spare area.

16. The method as claimed in claim 13, wherein the first and second parts are assigned in the data area.

17. A recording medium comprising:
a data area including a spare area, the spare area including a replacement area;
a lead-in area; and
a defect management area, the defect management area including a first part and a second part, the time for using the first part being different from the time for using the second part,
wherein the first part is used to record therein defect management information generated during a recording operation, and the second part is used to record therein defect management information generated during a reproducing operation,
wherein the defect management information generated during the recording operation includes position information of a defective unit and a corresponding replacement unit, and the defect management information generated during the reproducing operation includes position information of a defective unit and a corresponding replacement unit, and
wherein the defect management area is configured to store therein a first access pointer and a second access pointer, the first access pointer indicating a position of the defect management information recorded in the first part and the second access pointer indication a position of the defect management information recorded in the second part.

18. The method as claimed in claim 17, wherein the first part and the second part of the defect management area are assigned in the lead-in area separately.

19. The method as claimed in claim 17, wherein the first part of the defect management area is assigned in the lead-in area and the second part of the defect management area is assigned in the spare area.

20. The recording medium as claimed in claim 17, wherein the first and second parts are assigned in the data area.

21. An apparatus for managing a defective area of a recording medium having a data area, a lead-in area and a lead-out area, the apparatus comprising:
a pick up unit being configured to read/record data from/on the recording medium; and
a controller, operatively coupled to the pick up unit, being configured to detect a defective unit during reproducing or recording operation, and the controller further configured to control the pick up unit to record the data of the defective unit in a replacement unit and record defect management information in a defect management area,
wherein the defect management area includes a first part and a second part, the first part is used to record therein defect management information generated during a recording operation and the second part is used to record therein defect management information generated during a reproducing operation,
wherein the defect management information generated during the recording operation includes position information of a defective unit and a corresponding replacement unit, and the defect management information generated during the reproducing operation includes position information of a defective unit and a corresponding replacement unit, and
wherein said controller is further configured to control the pick up unit to record a first access pointer and a second access pointer in the defect management area, the first access pointer indicating a position of the defect management information recorded in the first part and the second access pointer indicating a position of the defect management information recorded in the second part.

22. The apparatus as claimed in claim 21, wherein the first and the second parts of the defect management area are assigned in the lead-in area respectively.

23. The apparatus as claimed in claim 21, wherein the replacement unit is included in a spare area, and the spare area is assigned in the data area.

24. The apparatus as claimed in claim 21, wherein the first and second parts are assigned in the data area.

* * * * *